US010351351B2

(12) United States Patent
Schulte Strathaus et al.

(10) Patent No.: US 10,351,351 B2
(45) Date of Patent: Jul. 16, 2019

(54) PROCESS AND APPARATUS FOR REGULATING THE OPERATION OF A STRIPPING APPARATUS AT A CONVEYOR BELT (71) Applicant: F. E. SCHULTE STRATHAUS GMBH & CO. KG, Werl (DE)

(72) Inventors: Michael Schulte Strathaus, Wickede / Ruhr (DE); Harald P. Mathis, Bonn (DE); Andreas Haase, Muenster (DE); Marcus Stiemer, Hamburg (DE); Marco Rozgic, Duesseldorf (DE)

(73) Assignee: F. E. SCHULTE STRATHAUS GMBH & CO. KG, Werl (DE)

( * ) Notice: Subject to any disclaimer, the term of this patent is extended or adjusted under 35 U.S.C. 154(b) by 0 days.

(21) Appl. No.: 16/064,160

(22) PCT Filed: Nov. 22, 2016

(86) PCT No.: PCT/EP2016/001965
§ 371 (c)(1),
(2) Date: Jun. 20, 2018

(87) PCT Pub. No.: WO2017/108150
PCT Pub. Date: Jun. 29, 2017

(65) Prior Publication Data
US 2019/0002207 A1  Jan. 3, 2019

(30) Foreign Application Priority Data

Dec. 21, 2015 (DE) ........................ 10 2015 016 461
Jan. 15, 2016 (DE) ........................ 10 2016 000 387

(51) Int. Cl.
*B65G 23/44* (2006.01)
*B65G 43/00* (2006.01)
(Continued)

(52) U.S. Cl.
CPC ............. *B65G 45/16* (2013.01); *B65G 45/12* (2013.01)

(58) Field of Classification Search
CPC ....... B65G 23/44; B65G 43/00; E01C 23/088; E01C 23/127
(Continued)

(56) References Cited

U.S. PATENT DOCUMENTS 4,182,444 A * 1/1980 Fisher .................... B65G 45/16
15/256.5
4,189,046 A   2/1980 Ward et al.
(Continued)

FOREIGN PATENT DOCUMENTS

DE  102004014084 A1  10/2004
DE  60013937 T2     1/2005
(Continued)

OTHER PUBLICATIONS

International Search Report for International Application No. PCT/EP2016/001965, dated Mar. 7, 2017.
(Continued)

*Primary Examiner* — Douglas A Hess
(74) *Attorney, Agent, or Firm* — Jason H. Vick; Sheridan Ross, PC (57) ABSTRACT The subject of the invention is a method for regulating the operation of a stripping device on a conveyor belt (1) of a conveyor belt system for transported material (6), wherein, in order to strip transported material (6) adhering to the conveyor belt (1), a stripping segment (9) of the stripping device (8) is advanced onto the conveyor belt (1) with its stripping edge (10) by an advancing drive (13) and at least the advancing force with which the advancing drive (13) advances the at least one stripping segment (9) onto the conveyor belt (1) is regulated as a regulating variable by an
(Continued)

electronic controller (14) on the basis of the value, determined by at least one sensor (15), of at least one guide variable. This method is optimized in that the output signal of an optical sensor (15, 15', 15'') that is embodied as an image processing electronic system is used as a guide variable, said sensor optically capturing the state of the conveyor belt (1) or of the stripping segment (9), and/or in that the output signal of at least one acoustic sensor (16) embodied as a microphone and/or as an electronic sound converter is used as a guide variable.

24 Claims, 5 Drawing Sheets

(51) Int. Cl.
*B65G 45/16* (2006.01)
*B65G 45/12* (2006.01)

(58) Field of Classification Search
USPC ........................................ 198/497, 498, 499
See application file for complete search history.

(56) References Cited

U.S. PATENT DOCUMENTS

| | | | | |
|---|---|---|---|---|
| 5,622,249 | A * | 4/1997 | Morin | B65G 45/12 15/256.6 |
| 6,374,990 | B1 * | 4/2002 | Swinderman | B65G 45/12 198/497 |
| 6,591,969 | B2 * | 7/2003 | Swinderman | B65G 45/12 198/497 |
| 6,971,503 | B2 * | 12/2005 | Thompson | B65G 45/22 198/494 |
| 6,986,418 | B2 * | 1/2006 | Swinderman | B65G 45/12 198/497 |
| 7,677,079 | B2 * | 3/2010 | Radziszewski | G01N 3/56 73/7 |
| 7,866,457 | B2 * | 1/2011 | Swinderman | B65G 45/12 198/497 |
| 8,205,741 | B2 * | 6/2012 | Swinderman | B65G 45/16 198/499 |
| 8,579,102 | B2 * | 11/2013 | Bryl | B65G 45/22 198/494 |
| 8,973,738 | B2 * | 3/2015 | Hilarides | B65G 45/10 198/494 |
| 9,731,906 | B2 * | 8/2017 | Strathaus | B65G 45/16 |
| 9,796,534 | B2 * | 10/2017 | Bott | H02J 50/00 |
| 10,273,091 | B2 * | 4/2019 | Li | B65G 43/02 |
| 2002/0107625 | A1 | 8/2002 | Beck et al. | |
| 2008/0053792 | A1 * | 3/2008 | Swinderman et al. | |
| 2009/0078537 | A1 * | 3/2009 | Swinderman et al. | |
| 2009/0120768 | A1 | 5/2009 | Kusel | |
| 2009/0294252 | A1 | 12/2009 | Swinderman et al. | |
| 2012/0031736 | A1 | 2/2012 | Swinderman et al. | |
| 2012/0241288 | A1 | 9/2012 | Swinderman et al. | |
| 2014/0284177 | A1 * | 9/2014 | Chiba | |
| 2017/0174441 | A1 | 6/2017 | Strathaus | |

FOREIGN PATENT DOCUMENTS

| | | |
|---|---|---|
| DE | 102005029637 A1 | 1/2007 |
| DE | 602004005771 T2 | 1/2008 |
| DE | 202009004182 U1 | 8/2010 |
| DE | 202014007229 U1 | 7/2015 |
| EP | 1221280 | 7/2002 |
| WO | WO 2010/108670 | 9/2010 |

OTHER PUBLICATIONS

Written Opinion for International Application No. PCT/EP2016/001965, dated Mar. 7, 2017.
International Preliminary Report on Patentability for International Application No. PCT/EP2016/001965, dated Jul. 5, 2018.

* cited by examiner

PROCESS AND APPARATUS FOR REGULATING THE OPERATION OF A STRIPPING APPARATUS AT A CONVEYOR BELT

CROSS-REFERENCE TO RELATED APPLICATIONS

This application is a National Stage Application under 35 U.S.C. 371 of PCT Application No. PCT/EP2016/001965, having an international filing date of Nov. 22, 2016 which designated the United States, which PCT application claimed the benefit of German Application No. 10 2015 016 461.9, having a filing date of Dec. 21, 2015 and German Application No. 10 2016 000 387.1, having a filing date of Jan. 15, 2016, each of which are incorporated herein by reference in their entirety.

SUMMARY

The invention relates to a process for regulating the operation of a stripping apparatus at a conveyor belt of a conveyor belt system for transported material, wherein the conveyor belt is driven in an endlessly revolving manner by a running drive and said conveyor belt runs in the conveying direction in a conveying portion lying on top, and runs in the return direction, opposite to the conveying direction, in a return portion lying therebelow, wherein, for the purposes of stripping transported material adhering to the conveyor belt in the transition region, situated at the front in the conveying direction, from the conveying portion to the return portion and/or in the initial region of the return portion situated there, at least one stripping segment of the stripping apparatus is set with its stripping edge against the conveyor belt by a setting drive, wherein at least the setting force, with which the setting drive sets the at least one stripping segment against the conveyor belt, is regulated as a controlled variable by an electronic controller according to the stipulation of the value of at least one reference variable established by at least one sensor.

The subject matter of the invention also relates to a conveyor belt system, comprising a conveyor belt, arranged in an endlessly revolving manner with a conveying portion lying on top, and a return portion lying therebelow, a running drive that is connected in terms of drive technology to the conveyor belt and that allows the conveyor belt to be drivable in an endlessly revolving manner in the conveying direction in the conveying portion and in the return direction, opposite to the conveying direction, in the return portion, a stripping apparatus for stripping transported material adhering to the conveyor belt, said stripping apparatus having at least one stripping segment, which, with a stripping edge, can be set against the conveyor belt, wherein transported material adhering to the conveyor belt is strippable from the conveyor belt by means of the stripping apparatus in the transition region, situated at the front in the conveying direction, from the conveying portion to the return portion and/or in the initial region of the return portion situated there, a setting drive for the at least one stripping segment, by means of which the stripping edge of the stripping segment can be set against the conveyor belt, and an electronic controller, wherein at least the setting force, with which the at least one stripping segment can be set against the conveyor belt by means of the setting drive, is regulable as a controlled variable by the electronic controller according to the stipulation of the value of at least one reference variable established by at least one sensor.

Conveyor belt systems use a moving, regularly endlessly revolving conveyor belt for transporting transported material, in particular sand, gravel, coal or other bulk materials, from one location to another location. The conveyor belt is regularly driven in an endlessly revolving manner by a running drive, namely in the conveying direction in a conveying portion lying on top, and in the return direction opposite to the conveying direction in a return portion lying therebelow. In the transition region from the conveying portion to the return portion, the conveyor belt runs over a deflection roller. When the transported material falls from the conveyor belt at the end of the conveying portion in the transition region of the conveyor belt, a residue of the transported material sometimes remains adhering to the conveyor belt. A stripping apparatus is used to strip off the remaining transported material that adheres to the conveyor belt.

Normally, a first stripping apparatus is situated directly at the deflection roller in the lower part of the transition region from the conveying portion to the return portion of the conveyor belt. Such a stripping apparatus is often referred to as a primary stripper. Often, a second stripping apparatus, which is often referred to as a secondary stripper, is situated on the lower return portion of the conveyor belt.

Stripping the transported material adhering to the conveyor belt is achieved by means of a stripping segment that, with its stripping edge, is set against the conveyor belt by a setting drive. Usually, a stripping apparatus has a plurality of stripping segments that, as seen over the width of the conveyor belt, are arranged next to one another, sometimes also offset to one another. Said stripping segments are often fastened to a rotatable and/or linearly adjustable bearing shaft that extends transversely to the conveyor belt. The bearing shaft is driven by a setting drive and then the stripping segments on the bearing shaft are thus set together against the conveyor belt. In this respect, reference is made, inter alia, to DE 20 2014 007 229 U1, U.S. Pat. No. 4,189,046 A, DE 20 2009 004 182 U1 and DE 600 13 937 T2.

There are also more elaborate structures, in which each individual stripping segment of a stripping apparatus is set by way of a dedicated setting drive against the conveyor belt.

During the operation, the stripping segments wear starting from the stripping edges, as these are permanently in abrasive engagement with the revolving conveyor belt.

In the prior art from which the invention starts (DE 60 2004 005 771 T2), the operation of the stripping apparatus at the conveyor belt of the conveyor belt system for transported material is regulated, to be precise by virtue of the setting force, with which the setting drive sets the at least one stripping segment against the conveyor belt, being regulated as a controlled variable by an electronic controller according to the stipulation of the value of at least one reference variable established by at least one sensor. A plurality of sensors that capture a plurality of reference variables are provided in the process therein, specifically a blade wear sensor, a load sensor and a temperature sensor at each stripping segment. All sensors are integrated into the stripping segment itself and supply their output values to the electronic controller which, on the basis of the values of the various reference variables established thus, regulates the setting angle of the stripping segment and the setting force of the stripping segment as controlled variables in order, ultimately, to regulate the system power of the entire stripping apparatus.

In the case of conveyor belt systems of the type in question, the stripping process is influenced by a plurality of parameters:

the type of transported material (wet, damp, sticky, fine-grained, coarse-grained, abrasive, etc.), the quality and the state of the conveyor belt (new, worn, hard, soft, etc.), quality and/or state of the links of the conveyor belt (adhesively bonded, vulcanized, mechanically connected, damaged; straight embodiment, oblique embodiment, etc.), material of the conveyor belt (rubber, plastics, coated, uncoated, etc.), material of the stripping segment and possibly, in the case of a separate configuration, of its stripping edge (plastics, rubber, metal), position of the stripping segment relative to the conveyor belt (primary stripper, secondary stripper), quality and embodiment of the conveyor belt system overall (stable/unstable, length of the conveyor belt, running speed of the conveyor belt, width and thickness of the conveyor belt, tension of the conveyor belt, embodiment of the substructures and guides of the conveyor belt, spatial conditions for the stripping apparatus).

In these many process parameters that have an influence on the operation of a conveyor belt system, there has to be further consideration that conveyor belt systems of the type in question can be up to several kilometers long and that also the width of the conveyor belts of up to 3 to 4 m may be significant.

In the known process from which the invention starts (DE 60 2004 005 771 T2), only parameters of the stripping segments themselves are used and electrically or electromechanically captured (strain gauges, temperature sensors, wear elements) as reference variables. Using this, the regulation of the operation of the stripping apparatus at a conveyor belt of a conveyor belt system possible therewith only captures a small part of the process parameters that are relevant to the process overall.

The teaching is based on the object of specifying a process for regulating the operation of a stripping apparatus at a conveyor belt of a conveyor belt system for transported material, in which an improved stripping process on the conveyor belt is achieved by a more comprehensive capture of reference variables. Accordingly, a conveyor belt system that is improved in this respect should also be specified.

The problem highlighted above is solved in the process referred to above by virtue of the output signal of an optical sensor embodied as an image processing electronic system being used as a reference variable, said optical sensor optically capturing the state of the conveyor belt in a restricted monitoring region or the state of the at least one stripping segment, and/or by virtue of the output signal of at least one acoustic sensor embodied as a microphone and/or as an electronic sound transducer being used as a reference variable, said acoustic sensor capturing the noise caused by the running conveyor belt system, particularly in a restricted monitoring region.

According to the invention, an optical data capture system is primarily realized. What is essential to the invention is that the output signal of an optical sensor embodied as an image processing electronic system is used as a reference variable. Such a sensor can be embodied as a digital camera or operate on the basis of other electronic image processing techniques.

What is essential is that the optical sensor optically captures the state of the conveyor belt in a restricted monitoring region. If only a single optical sensor is provided, this optical sensor can optically capture the state of the at least one stripping segment as the alternative.

A working conveyor belt system has a typical acoustic frequency spectrum. This spectrum reflects, inter alia, the vibrations of the conveyor belt system overall. As soon as the conveyor belt system is no longer in its normal operation, for example because there already is too much wear on the stripping segments, there is a change in the frequency spectrum of the noise caused by the running conveyor belt system. Proceeding from this discovery, an alternative solution possibility according to the invention lies in the use of the output signal of at least one acoustic sensor embodied as a microphone and/or as an electronic sound transducer as a reference variable.

Naturally, the reference variables (optical, acoustic) that are used as alternatives or employed together according to the invention can be complemented by further reference variables as are known from the prior art, for example, should this be technically expedient.

In a further improved manner, the process according to the invention should be realized with a plurality of optically based reference variables. Here, provision is preferably made according to the invention, for the purposes of providing a plurality of reference variables from in each case one sensor embodied as an image processing electronic system, for there to be optical capture of:

the state of the conveyor belt in a region of the conveying portion, preferably near the transition region, and/or the state of the conveyor belt in a region of the return portion, preferably near the transition region, and/or the state of the at least one stripping segment.

According to the invention, a real-time-capable optical monitoring system for monitoring the operation and wear of the stripping segments of the stripping apparatus is realized. Here, in the preferred case, a broader approach with an optical system is chosen, by means of which the load of the conveyor belt, the stripping segments of the stripping apparatus and the cleaning result on the conveyor belt downstream of the stripping apparatus in the running direction are monitored using various optical sensors.

According to a further preferred configuration, for the purposes of optically capturing the state of the at least one stripping segment, it is possible to provide for the process according to the invention for the at least one stripping segment to be provided with at least one optically identifiable wear mark, which is captured by the assigned optical sensor. Within the scope of optical capture of the wear mark of the stripping segment, an appropriate warning signal can be triggered by the electronic controller for the purposes of notifying the control room so that servicing measures can be adopted.

In the present process according to the invention, there is a further recommendation for the output signal of at least one acoustic sensor embodied as a microphone and/or electronic sound transducer to be used in addition to the signal of an optical sensor. The integration of an acoustic sensor into the process according to the invention renders it possible to determine signs of wear at the conveyor belt and/or at the stripping segments in good time.

In the process completed in this respect, work is carried out both with the aid of optical sensors and with the aid of at least one acoustic sensor. Combining the measurement values established thus in order to form different reference variables improves the regulation characteristic of the process according to the invention.

Independently of whether at least one acoustic sensor is used on its own or in addition to at least one optical sensor, the recommendation in any case is for the frequency spectrum or part of the frequency spectrum of the noise caused by the running conveyor belt system to be captured by an acoustic sensor and evaluated by the electronic controller.

Typically, the frequency range that comes into question here is a frequency range between approximately 10 Hz and approximately 20 000 Hz. This is the range of frequencies that are audible by the human sense of hearing. The at least one acoustic sensor can have different sensitivities in this range; possibly, it also can cover only part of the frequency range.

Sound waves are transmitted as air-borne sound or as structure-borne sound. A microphone serves to capture air-borne sound; electronic sound transducers serve to capture structure-borne sound. In this respect, a further preferred teaching of the invention recommends that sound waves in the form of structure-borne sound be captured by an acoustic sensor in the form of an electronic sound transducer.

In a further concretization of the configuration of the invention described above, it is recommended that an electronic sound transducer in the form of a linear acceleration sensor or a rotation rate sensor be used as an acoustic sensor, which is positioned at an appropriate place in or at the stripping apparatus. If a plurality of acoustic sensors is provided, these can be present in different variants, for example externally as microphones for capturing air-borne sound and, additionally, at the system in the form of linear acceleration sensors on the one hand and, installed elsewhere, in the form of rotation rate sensors on the other hand.

Until now, only the setting force at the conveyor belt produced by the setting drive of the at least one stripping segment has been discussed as a controlled variable for the process according to the invention. Moreover, the setting angle of the stripping segment with respect to the conveyor belt and the radial distance of the bearing site of the stripping segment from the conveyor belt are also possible controlled variables in respect of said stripping segment. For the purposes of optimizing the functionality of the process according to the invention, it is recommended that, as a further controlled variable, the speed of the running drive of the conveyor belt be regulated according to the stipulation of the reference variable or the reference variables. In this way, it is possible to further optimize the process overall in terms of the operation of the stripping apparatus, for example by letting the conveyor belt system run slower in the case of relatively strongly worn stripping segments which, however, are not yet currently intended to be replaced.

For the purposes of establishing the data required for the regulation according to the invention, it may be recommended to perform the regulation by means of the electronic controller on the basis of a setpoint/actual comparison with stored setpoint values.

It is very particularly preferable to carry out the actual/setpoint comparison in such a way that certain typical process states of the conveyor belt and/or of the at least one stripping segment are initially captured and stored by means of the electronic controller and that the regulation with the electronic controller is performed on the basis of a comparison of the established actual state with at least one stored typical process state—the setpoint state.

The electronic controller is operated with a software which partly operates as simulation software and which implements various calculation processes, for example on the basis of the finite element framework. In the particularly preferred process explained above at the end, the electronic controller is initially operated in a learning mode, during which the data for the subsequent setpoint/actual comparison are then established.

The process according to the invention can be further optimized by virtue of, in the case of a plurality of stripping segments, each individual stripping segment being individually set against the conveyor belt by means of a dedicated setting drive.

The subject matter of the invention is not only a process for regulating the operation of a stripping apparatus, as described above, but also a conveyor belt system having such regulation. In this respect, the problem highlighted above is solved in a conveyor belt system, which was referred to at the outset, by virtue of the sensor being embodied as an image processing electronic system in and being able to be used to optically capture a certain spatial monitoring region and by virtue of the optical sensor being arranged at the conveyor belt system in such a way that a portion of the conveyor belt or at least one portion of the at least one stripping segment lies in the monitoring region, and/or by virtue of, for the purposes of capturing a further reference variable for the electronic controller, an acoustic sensor, embodied as a microphone and/or as an electronic sound transducer, being provided at the conveyor belt system, in particular near the transition region from the conveying portion to the return portion of the conveyor belt, and connected to the electronic controller, wherein the noise caused by the running conveyor belt system is capturable by the acoustic sensor.

An essential solution criterion for the conveyor belt system is that the sensor is embodied optically as an image processing electronic system and can be used to optically capture a certain spatial monitoring region and that the optical sensor is arranged at the conveyor belt system in such a way that a portion of the conveyor belt or at least one portion of the at least one stripping segment lies in the monitoring region.

An alternative solution criterion for the conveyor belt system is an acoustic sensor.

In the case of the conveyor belt system, too, like in the process according to the invention, it is particularly preferable to work with a combination of optical sensor and acoustic sensor.

Preferred configurations and developments of the conveyor belt system according to the invention are the subject matter of the dependent claims in this respect. These will be explained in more detail below together with the first, independent apparatus claim in conjunction with the explanation of a preferred exemplary embodiment of the invention on the basis of the drawing. In so doing, variants, alternatives and advantages of the individual variants will also be discussed.

BRIEF DESCRIPTION OF THE DRAWINGS

Thus, the invention will be explained in more detail below on the basis of a drawing that merely illustrates a preferred exemplary embodiment. In the drawing.

DETAILED DESCRIPTION

All necessary explanations in relation to the process for regulating the operation of a stripping apparatus at a conveyor belt of a conveyor belt system for transported material can be found in the general part of the description. Reference can be made to these explanations.

Now, the example of a conveyor belt system according to the invention is explained in the present case.

Figure 1:
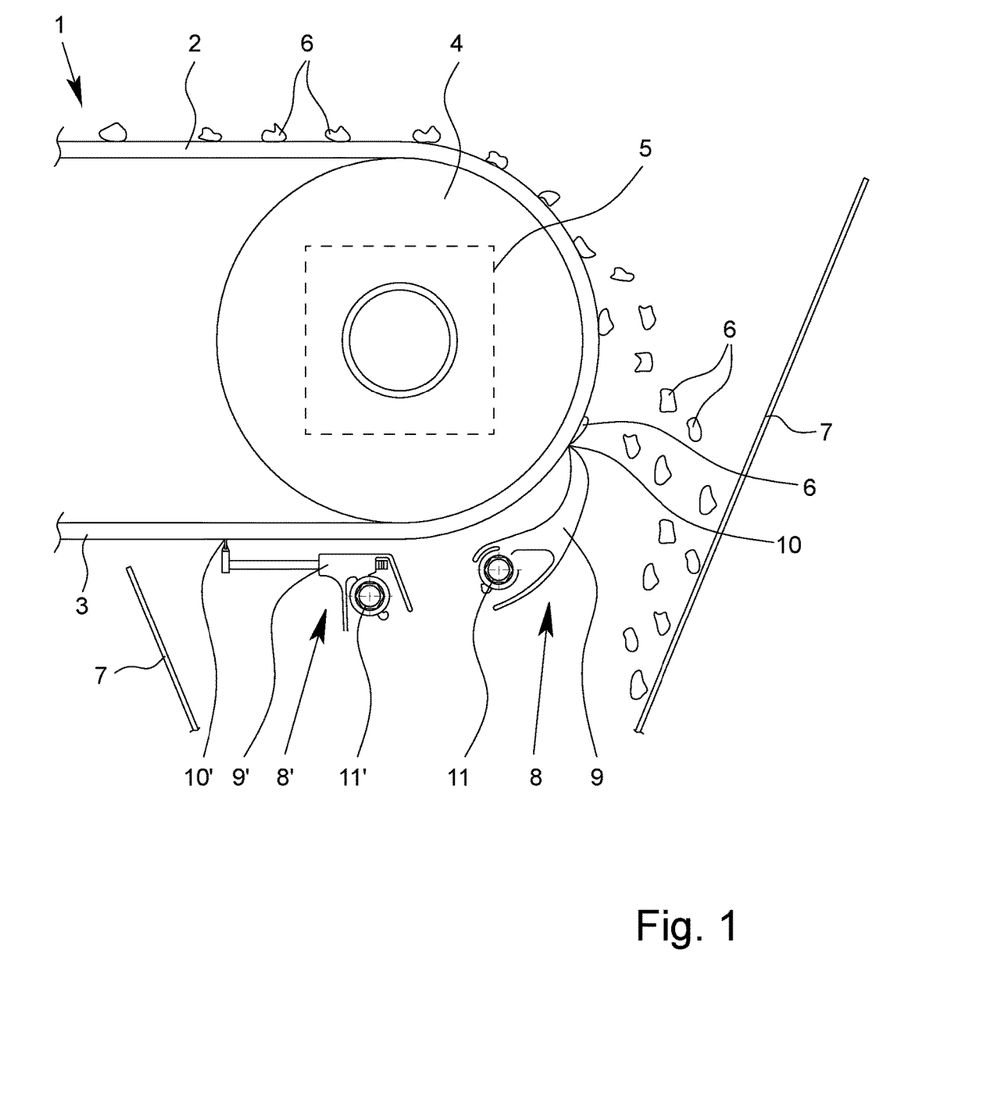
FIG. 1 shows part of a conveyor belt system for transported material with two stripping apparatuses situated thereon in a side view.

FIG. 1 initially shows, in a schematic illustration, the front end, in the conveying direction, of a conveyor belt system for transported material.

FIG. 1 shows the end of a conveyor belt system comprising a conveyor belt 1, arranged in an endlessly revolving manner with a conveying portion 2, lying on top, and a return portion 3 lying therebelow. The conveyor belt 1 runs around a deflection roller 4 in the transition region from the conveying portion 2 to the return portion 3.

Connected to the conveyor belt 1 in terms of drive technology is a running drive 5, which is merely indicated using dashed lines in FIG. 1. In the exemplary embodiment that is illustrated here and preferred, the running drive 5 is connected in terms of drive technology to the deflection roller 4, which in this respect also serves as a drive roller, such that the conveyor belt 1 is moved by rotating the deflection roller 4. However, this is only one example for the arrangement of a running drive 5. In principle, the running drive 5 naturally can contact the conveyor belt 1 at different points on the conveyor belt system in order to drive said conveyor belt in the conveying direction.

On the conveyor belt 1, to be precise at the top on the conveying portion 2 thereof, transported material 6 situated thereon is indicated in FIG. 1. In the introductory part of the description, reference has already been made to the fact that conveyor belt systems of the type in question usually serve to transport bulk material, i.e., for example, sand, gravel, coal, ore, etc.

FIG. 1 illustrates how the transported material 6 is cast from the conveyor belt 1 by deflecting the conveyor belt 1 from the conveying portion 2 to the return portion 3 and how said transported material is then guided to a collection container or another suitable place, steered by a baffle plate 7. As indicated on the right in FIG. 1, some residue of the transported material 6 sometimes remains adhering to the conveyor belt 1. In this respect, a stripping apparatus 8 serves to strip transported material 6 that adheres to the conveyor belt 1. The stripping apparatus 8 has at least one stripping segment 9, which, with a stripping edge 10, can be set against the conveyor belt 1. Thus, the stripping edge 10 of the stripping segment 9 of the stripping apparatus 8 rests more or less clearly against the conveyor belt 1 such that transported material 6 that still adheres to the conveyor belt 1 strikes the stripping edge 10 of the stripping segment 9 and then is stripped off the conveyor belt 1, even though it adheres relatively securely to the conveyor belt 1.

In FIG. 1, the already mentioned stripping apparatus 8 can be seen on the right-hand side, said stripping apparatus in this case being a primary stripper that contacts the conveyor belt in the transition region, situated at the front in the conveying direction, from the conveying portion 2 to the return portion 3 (primary stripper or head stripper). Here, the stripping apparatus 8 has a bearing shaft 11 for the at least one stripping segment 9. This corresponds to the prior art of DE 20 2014 007 229 U1, explained at the outset.

FIG. 1 shows a further stripping apparatus 8' with the stripping segment 9', the stripping edge 10' and bearing shaft 11' thereof. This further stripping apparatus 8' contacts the conveyor belt 1 in the initial region of the return portion 3; this is a secondary stripper (lower belt stripper). It is used to release fine residue of the transported material 6, which still adheres to the conveyor belt 1 even after the effect of the stripping apparatus 8, from the conveyor belt 1 before the conveyor belt 1, with its return portion 3, starts the return travel to the further deflection roller situated at the other end of the conveyor belt system.

Figure 2:
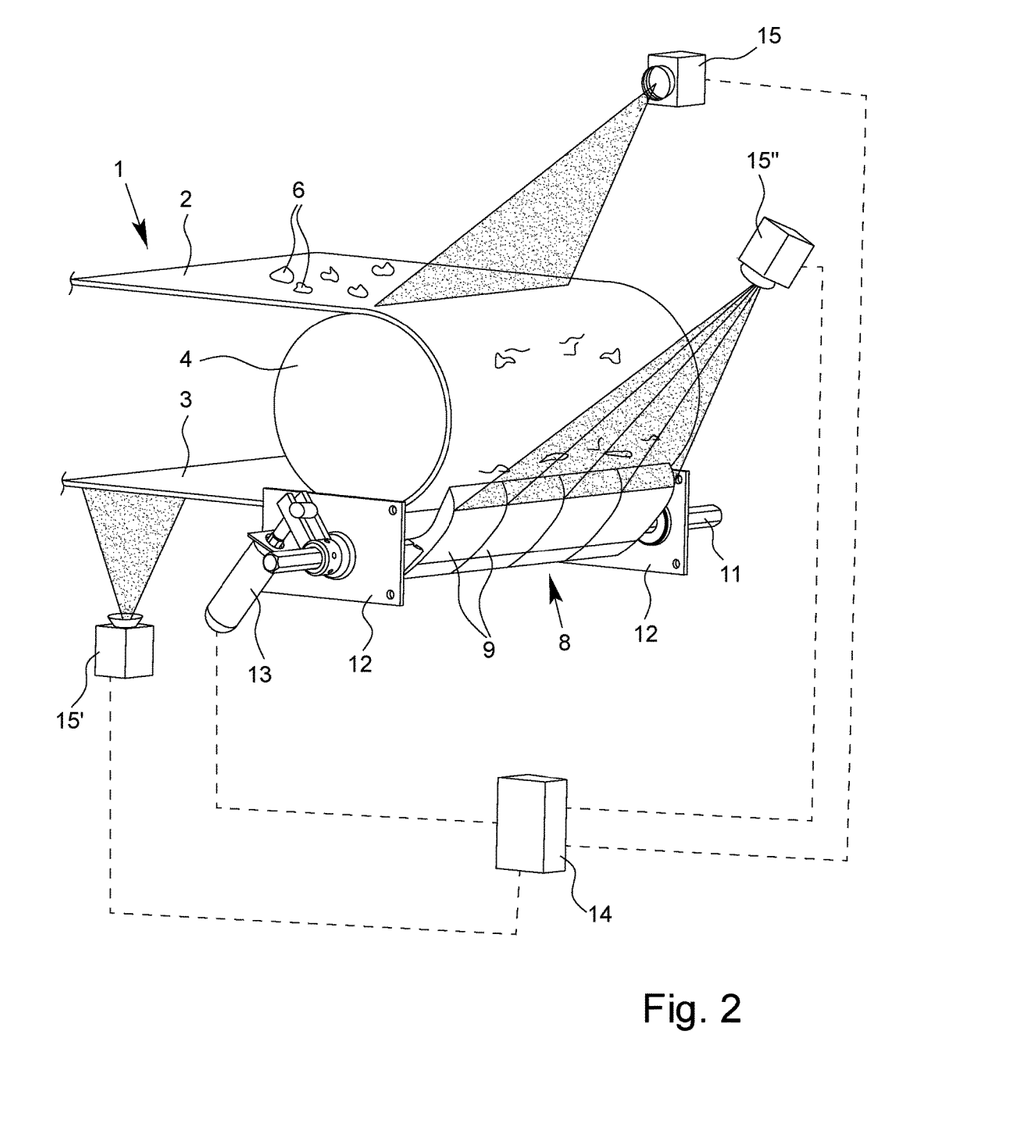
FIG. 2 shows a first exemplary embodiment of a conveyor belt system according to the invention, in a simplified schematic fashion, in a perspective view.

FIG. 2 shows a perspective view of the end of a conveyor belt system illustrated in a side view in FIG. 1. It is possible to recognize that the stripping apparatus 8 has a plurality of stripping segments 9 in this case, said stripping segments being arranged next to one another in distributed fashion over the width of the conveyor belt 1. With its stripping segments 9, the stripping apparatus 8 is seated bottom right in the transition region from the conveyor belt portion 2 to the return portion 3 of the conveyor belt 1.

Near the deflection roller 4 for the conveyor belt 1, it is possible to see, to the left and right, respectively one bearing structure 12 for the bearing shaft 11, situated there, of the stripping apparatus 8. In the exemplary embodiment illustrated here, the bearing shaft 11 has a hexagonal form. Here, a total of four stripping segments 9 are arranged on the bearing shaft 11. In detail, reference can be made to the citations mentioned at the outset in relation to the prior art in this respect.

From FIG. 2, it is possible to further identify that a setting drive 13 is provided for the at least one stripping segment 9 of the stripping apparatus 8, i.e., the total of four stripping segments 9 in the present case, the stripping segment 9 being able to be set against the conveyor belt 1 with its stripping edge 10 by means of said setting drive. Examples for setting drives 13 are likewise described in the prior art cited at the outset. The illustrated exemplary embodiment of a setting drive 13 emerges substantially from DE 20 2014 007 229 U1, without this being intended to be interpreted as restrictive.

FIG. 2 further plots an electronic controller 14. The electronic controller 14 serves to regulate at least the setting force, by means of which the at least one stripping segment 9 can be set against the conveyor belt 1 by means of the setting drive 13, as a controlled variable according to the stipulation of the value of at least one reference variable established by at least one sensor.

The illustrated exemplary embodiment shows four stripping segments 9 on a common bearing shaft 11 of the stripping apparatus 8, and so the four stripping segments 9 can be set together and in the same fashion against the conveyor belt 1 by adjusting the bearing shaft 11 by means of the setting drive 3.

Not shown is a particularly preferred structure, which exhibits stripping segments 9 that can be set individually, i.e., in which a plurality of stripping segments 9 are provided and a dedicated setting drive 13 is assigned to each individual stripping segment 9 such that each stripping segment 9, by means of its setting drive 13, can be set individually against the conveyor belt 1. Using stripping segments 9 that can be set individually, it is possible to react particularly well to the individual wear state of the respective stripping segment 9.

Should a fault occur at the conveyor belt 1, the stripping segments 9 can be folded away from the conveyor belt 1 in all cases, i.e. both in the case of the stripping segments 9 that are driven together and in the case of stripping segments 9 that are driven individually.

The abstract description provided above is concretized on the basis of FIG. 2 to the extent that the sensor 15, 15', 15" is embodied as an image processing electronic system. A certain spatial monitoring region is optically capturable using this sensor 15, 15', 15". The optical sensor 15, 15', 15" is arranged at the conveyor belt system in such a way that a portion of the conveyor belt 1 or at least one portion of the at least one stripping segment 9 lies in the monitoring region.

Thus, FIG. 2 shows how the optical data capture system according to the invention is realized in a preferred exemplary embodiment. The optical sensor 15, 15', 15" can be embodied as a digital camera, as illustrated here, or operate on the basis of other effective electronic image processing techniques. Thus, unlike in the prior art from which the invention proceeds, reference variables are not captured directly by sensors at or in the stripping segments 9; instead, work is carried out with contactless optical monitoring.

The illustrated and, in this respect, preferred exemplary embodiment has three optical sensors 15, 15', 15" overall.

A first optical sensor 15 is arranged in such a way that the state of the conveyor belt 1 in a region of the conveying portion 2 near the transition region is captured therewith. On the one hand, this optical sensor 15 captures the load of the conveying portion 2 of the conveyor belt 1 with transported material 6; on the other hand, it captures certain vibrations of the conveyor belt 1, which form in the conveying portion 2 during operation.

Further, a second optical sensor 15' is provided. It is used to capture the state of the conveyor belt 1 in a region of the return portion 3, near the transition region in this case. This captures how much transported material 6 residue still adheres to the conveyor belt 1 in the return portion 3 despite the work of the stripping apparatus 8 or the stripping apparatuses 8, 8'. Ultimately, this determines how effectively the stripping apparatus 8 or the stripping apparatuses 8, 8' work. Moreover, it is also possible here to optically capture a vibration image of the conveyor belt 1 in the return portion 3.

In the illustrated exemplary embodiment, the third optical sensor 15" observes the stripping segments 9 of the stripping apparatus 8 and captures the state of at least one portion of at least one of the stripping segments 9, all stripping segments 9 arranged next to one another in the best case.

The sensors 15, 15', 15" listed above can be provided cumulatively, as illustrated in FIG. 2; however, depending on the embodiment of the conveyor belt system, it is also possible to use only one of the sensors or two of the sensors. Naturally, it is also possible to use even more optical sensors at other positions of the conveyor belt system in addition to the three optical sensors illustrated should the intention be to optically capture further reference variables or other measurement values.

For the third sensor 15" of the illustrated exemplary embodiment, which observes the stripping segments 9 of the stripping apparatus 8, it is of particular interest if provision is made for the at least one stripping segment 9 to be provided with at least one optically identifiable wear mark, which is capturable by the assigned optical sensor 15". Here, this can be certain forms, inserts, colors, etc. at the stripping segments 9, which signal that the stripping segments 9 have become worn to an extent that requires prompt servicing. In this case, it is possible, for example, to provide a signal to a control room that servicing of the conveyor belt system is pending.

Figure 3:
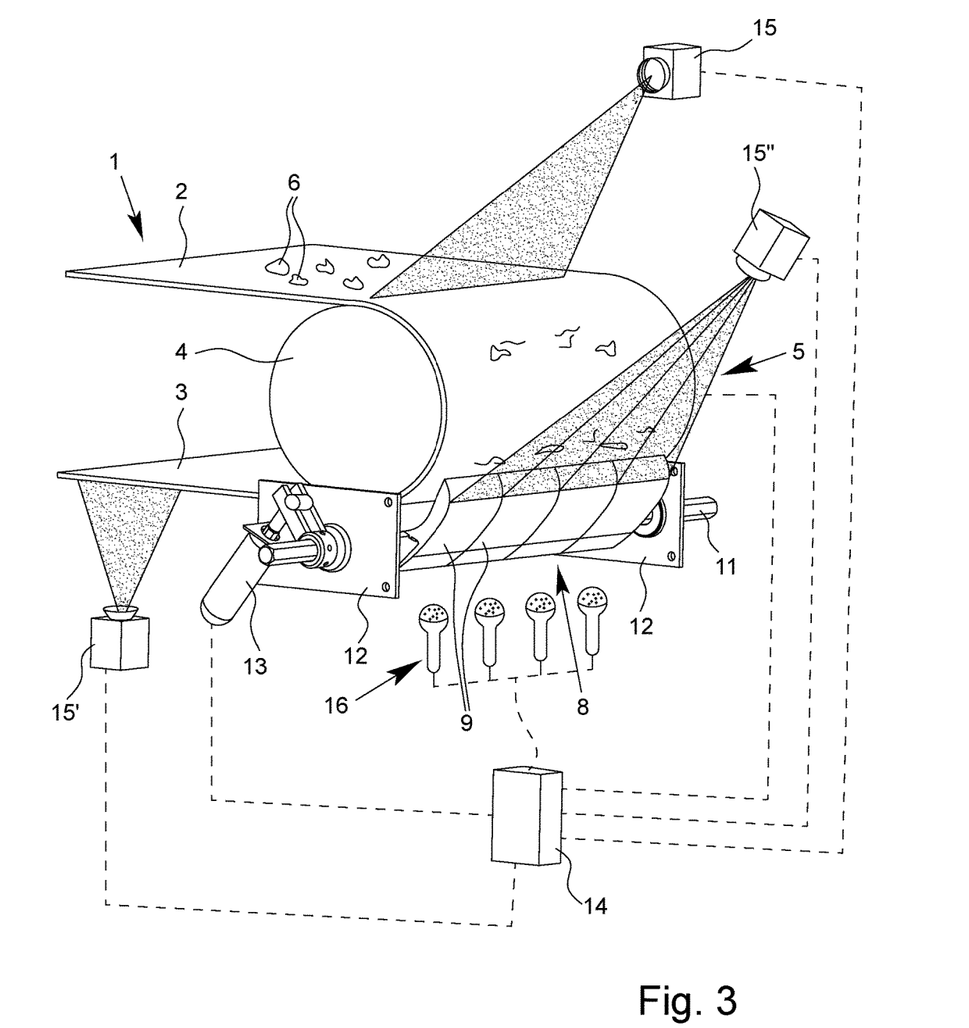
FIG. 3 shows the exemplary embodiment of FIG. 2, completed with an acoustic sensor.

FIG. 3 shows the exemplary embodiment of the conveyor belt system from FIG. 2 with an addition. The reference signs in FIG. 3 correspond to the reference signs in FIG. 2. Here, provision is additionally made for an acoustic sensor 16 that is embodied as a microphone and/or as an electronic sound transducer to be provided at the conveyor belt system, in particular near the transition region from the conveying portion 2 to the return portion 3 of the conveyor belt 1, and that is connected to the electronic controller 14 for the purposes of capturing a further reference variable for the electronic controller 14. Here, the acoustic sensor 16 is indicated as a row of a plurality of microphones that transmit their signals, possibly prepared appropriately, to the electronic controller 14.

According to a preferred teaching that is realized here, provision is made for the frequency spectrum of the noise caused by the running conveyor belt system to be capturable by the acoustic sensor 16 and to be evaluable by the electronic controller 14.

In the general part of the description, there is a detailed explanation in conjunction with the explanation of the process according to the invention as to the parameters for which the acoustic sensor 16 is expedient. Reference can be made to the explanations made there.

As already mentioned in the general part of the description, the use of only an acoustic sensor 16 or of a plurality of acoustic sensors of the same or different construction on their own also lies within the scope of the invention.

The use of at least one optical sensor 15 and/or an acoustic sensor 16 in conjunction with other sensors already known from the prior art in order to capture a greater number of reference variables also lies within the scope of the teaching of the invention.

Incidentally, FIG. 3 shows a further peculiarity of the preferred exemplary embodiment of the invention, modified in this respect, insofar as the running drive 5 of the conveyor belt 1 is connected to the electronic controller 14. The speed of the running drive 5 of the conveyor belt 1 is regulable by means of the electronic controller 14 according to the stipulation of the signals of the at least one sensor 15. The running drive 5 cannot be identified in FIG. 3 because it is covered by the deflection roller 4 and the conveyor belt 1 revolving thereon. However, the dashed line to the running drive 5 is plotted.

Overall, the electronic controller 14 is expediently configured in such a way that it has a data memory, in which setpoint values for measurement values of the at least one sensor, i.e., the optical sensors 15, 15', 15" and the acoustic sensors 16 in the exemplary embodiment illustrated here, are storable.

Such a data memory can be used particularly expediently by virtue of certain typical process states of the conveyor belt 1 and/or of the at least one stripping segment 9 being initially capturable and storable in the at least one data memory of the electronic controller 14, wherein, for the purposes of regulating the operation of the conveyor belt system by means of the electronic controller 14, a comparison of the established actual state with at least one stored typical process state of the conveyor belt system (setpoint state) is performable. In this respect, too, reference is made to the general part of the description with the explanation of the process according to the invention. Details of the learning process and the preferred algorithms are also specified there.

It may be of importance for the electronic controller 14 that a communications function is integrated here, said communications function having the object of visualizing potential dangers in situ or in a control room. To this end, corresponding limits and fitting algorithms for identifying dangerous or risky states of operation of the conveyor belt system are required. At suitable time intervals, information about the wear state of the conveyor belt 1, about the wear state of the stripping segments 9 of the stripping apparatus 8 or stripping apparatuses 8, 8' etc. should also be transmitted.

Figure 4:
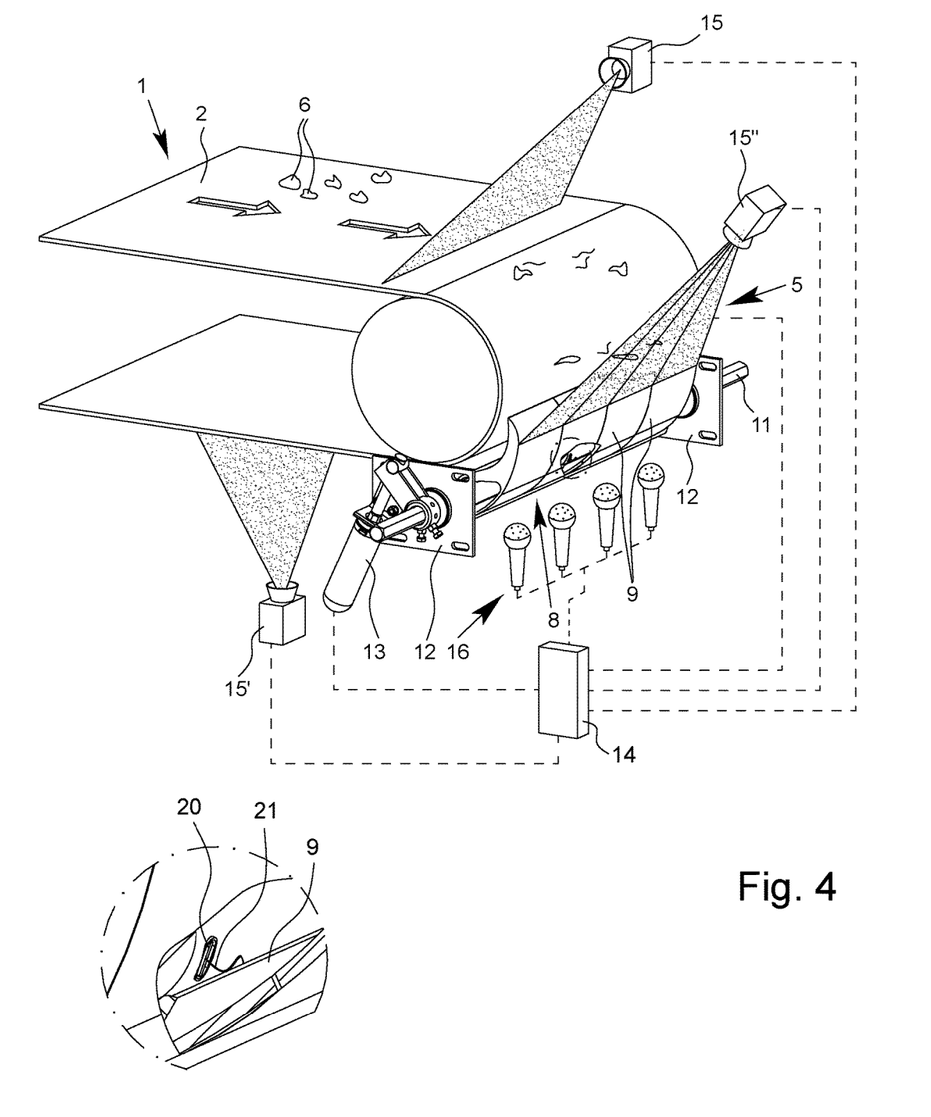
FIG. 4 shows an exemplary embodiment similar to FIG. 3, further completed with a further acoustic sensor, in a perspective view
Figure 5:
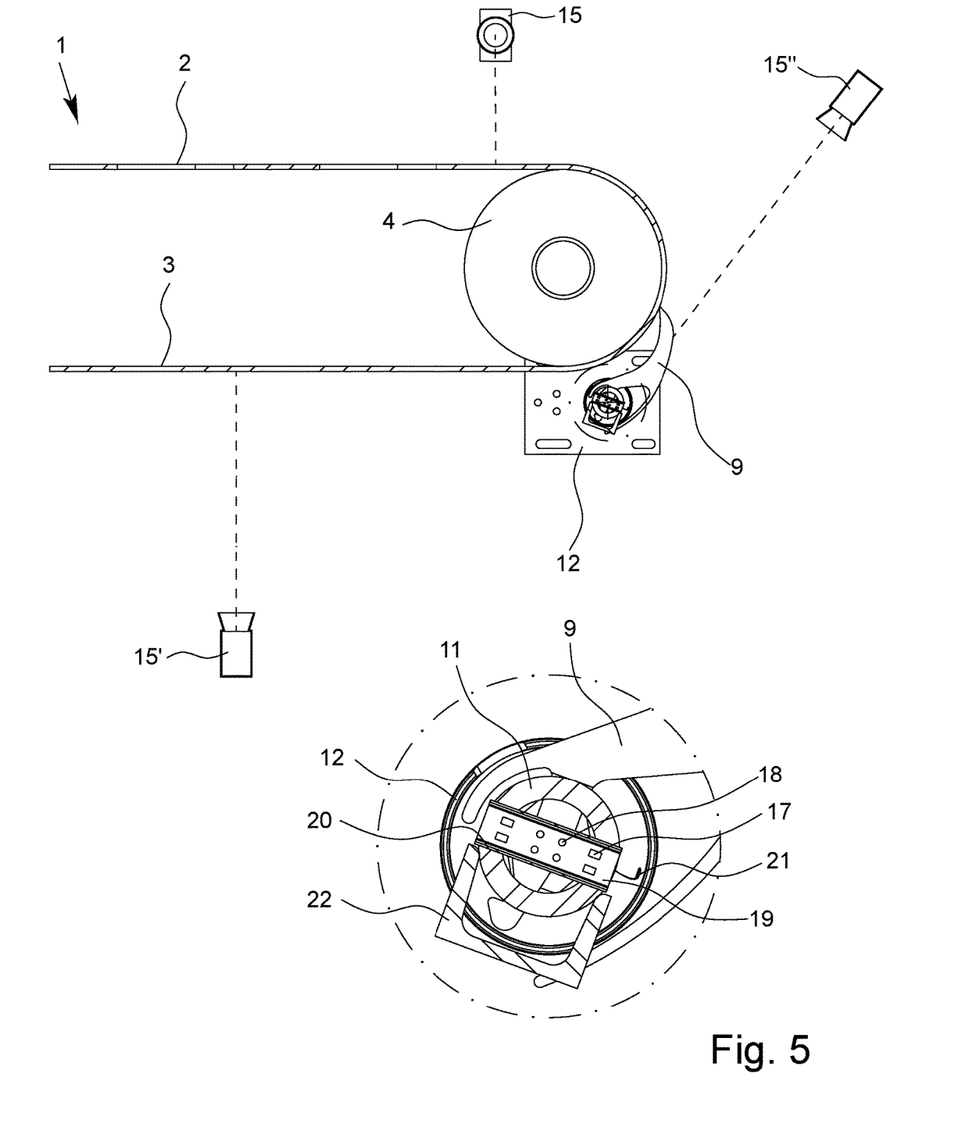
FIG. 5 shows the exemplary embodiment of FIG. 4 in a section approximately in the center for the purposes of elucidating the positioning of the acoustic sensor that is embodied as a sensor for structure-borne sound.

FIGS. 4 and 5 show a further configured embodiment of a conveyor belt system according to the invention. Here, the same reference signs are used as in FIG. 3, provided that the same components of the conveyor belt system are involved.

A dash-dotted circle, which identifies a section, is seen in the center of the stripping apparatus 8 in FIG. 4. This section is illustrated in a magnified fashion to the left in FIG. 4. It is possible to see that a cutout 20 can be seen here on the inside at the bearing shaft 11 of the stripping apparatus 8, from which a connection line 21 of an acoustic sensor 16' for structure-borne sound emerges. As is also illustrated by dashed lines here, this connection line 21 leads to the central controller 14.

FIG. 5 shows a section in the longitudinal direction through the portion of the conveyor belt system illustrated in FIG. 4, approximately in the center of FIG. 4. Here, too, a sectional illustration is again identified, which can be seen in a magnified fashion to the right in FIG. 5. What is shown here illustrated in a magnified fashion is a stripping segment 9, which is carried by the bearing shaft 11. This bearing shaft 11 has a cutout 20. A circuit board 19, surrounded by a sleeve, sits tight in the cutout 20. This circuit board 19 carries linear acceleration sensors 17 on the one hand and rotation rate sensors 18 on the other hand. These are examples, used here, for electronic sound transducers that can be used to record sound waves in the form of structure-borne sound. Ultimately, these electronic sound transducers, which together form a complex acoustic sensor 16' for structure-borne sound in this case, capture the vibrations and other movements of the bearing shaft 11 of the stripping apparatus 8. The circuit board 19 is connected to the electronic controller 14 of the conveyor belt system by means of the connection line 21, which is also indicated in the section in FIG. 5, and so the output signals of the sensors 17, 18 can be captured and evaluated at said electronic controller.

In the exemplary case, frequencies from the aforementioned frequency range of 5000 Hz to 7000 Hz are captured, said frequencies being significant to the functionality of the stripping apparatus 8 of the conveyor belt system.

A mechanically special structure can still be identified at the bearing shaft 11 in FIGS. 4 and 5, namely a reinforcement bracket 22, which is welded to the bearing shaft 11 in the exemplary embodiment illustrated here. It increases the flexural strength of the bearing shaft 11 for the special use case provided here.

Further, in the section in FIG. 5, it is possible to identify that the bearing structure 12 with the setting drive 13 sits on the end side at the end of the bearing shaft 11.

LIST OF REFERENCE SIGNS

1 Conveyor belt
2 Conveying portion
3 Return portion
4 Deflection roller
5 Running drive
6 Transported material
7 Baffle plate
8 Stripping apparatus
9 Stripping segment
10 Stripping edge
11 Bearing shaft
12 Bearing structure
13 Setting drive
14 Electronic controller
15 Sensor
16 Acoustic sensor
16' Acoustic sensor for structure-borne sound
17 Linear acceleration sensor
18 Rotation rate sensor
19 Circuit board
20 Cutout
21 Connection line
22 Reinforcement bracket

The invention claimed is:

1. A process for regulating the operation of a stripping apparatus at a conveyor belt of a conveyor belt system for transported material,
   wherein the conveyor belt is driven in an endlessly revolving manner by a running drive and said conveyor belt runs in the conveying direction in a conveying portion lying on top, and runs in the return direction, opposite to the conveying direction, in a return portion lying therebelow,
   wherein, for the purposes of stripping transported material adhering to the conveyor belt in a transition region, situated at the front in the conveying direction, from the conveying portion to the return portion and/or in the initial region of the return portion situated there, at least one stripping segment of the stripping apparatus is set with its stripping edge against the conveyor belt by a setting drive,
   wherein at least the setting force, with which the setting drive sets the at least one stripping segment against the conveyor belt, is regulated as a controlled variable by an electronic controller according to the stipulation of a value of at least one reference variable established by at least one sensor,
   wherein
   in that the output signal of at least one acoustic sensor embodied as an electronic sound transducer is used as a reference variable, and in that said acoustic sensor captures sound waves in the form of structure-borne sound.

2. The process as claimed in claim 1, wherein
   the sound waves with frequencies between approximately 5,000 Hz and approximately 7,000 Hz are captured by said acoustic sensor.

3. The process as claimed in claim 1, wherein
   a linear acceleration sensor or a rotation rate sensor is used as said acoustic sensor, which is positioned at an appropriate place in or at the stripping apparatus.

4. The process as claimed in claim 1, wherein
   as a further controlled variable, the speed of the running drive of the conveyor belt is regulated according to the stipulation of the reference variable or the reference variables.

5. The process as claimed in claim 1, wherein
the regulation is performed by means of the electronic controller on the basis of a setpoint/actual comparison with stored setpoint values,
wherein certain typical process states of the at least one stripping segment are initially captured and stored by means of the electronic controller and in that the regulation with the electronic controller is performed on the basis of a comparison of the established actual state with at least one stored typical process state.

6. The process as claimed in claim 1, wherein
in the case of a plurality of stripping segments, each individual stripping segment is individually set against the conveyor belt by means of a dedicated setting drive.

7. The process as claimed in claim 1, wherein the at least one stripping segment is arranged on a bearing shaft of the stripping apparatus and wherein the bearing shaft is driven by the setting drive,
the process characterized in that said acoustic sensor captures the vibrations of the bearing shaft of the stripping apparatus.

8. The process as claimed in claim 1, wherein
the output signal of an optical sensor embodied as an image processing electronic system is used as a further reference variable, said optical sensor optically capturing the state of the at least one stripping segment.

9. The process as claimed in claim 8, wherein
the at least one stripping segment is provided with at least one optically identifiable wear mark, which is captured by the further sensor.

10. A conveyor belt system, comprising
a conveyor belt, arranged in an endlessly revolving manner with a conveying portion lying on top, and a return portion lying therebelow,
a running drive that is connected in terms of drive technology to the conveyor belt and that allows the conveyor belt to be drivable in an endlessly revolving manner in the conveying direction in the conveying portion and in the return direction, opposite to the conveying direction, in the return portion,
a stripping apparatus for stripping transported material adhering to the conveyor belt, said stripping apparatus having at least one stripping segment, which, with a stripping edge, can be set against the conveyor belt, wherein transported material adhering to the conveyor belt is strippable from the conveyor belt by means of the stripping apparatus in a transition region, situated at the front in the conveying direction, from the conveying portion to the return portion and/or in the initial region of the return portion situated there,
a setting drive for the at least one stripping segment, by means of which the stripping edge of the stripping segment can be set against the conveyor belt, and
an electronic controller,
wherein at least the setting force, with which the at least one stripping segment can be set against the conveyor belt by means of the setting drive, is regulable as a controlled variable by the electronic controller according to the stipulation of a value of at least one reference variable established by at least one sensor,
wherein
the sensor is embodied as an electronic sound transducer and provided at the conveyor belt system and connected to the electronic controller, wherein sound waves in the form of structure-borne sound are capturable by the sensor.

11. The conveyor belt system as claimed in claim 10, wherein
the sound waves with frequencies between approximately 5,000 Hz and approximately 7,000 Hz are capturable by the sensor.

12. The conveyor belt system as claimed in claim 10, wherein
the electronic sound transducer is a linear acceleration sensor and/or a rotation rate sensor, wherein this at least one sensor is positioned at an appropriate place in or at the stripping apparatus.

13. The conveyor belt system as claimed in claim 12, wherein
the electronic sound transducer is arranged on a circuit board that is securely attached in or at the stripping apparatus.

14. The conveyor belt system as claimed in claim 13, wherein
the circuit board is arranged in or at the bearing shaft of the stripping apparatus.

15. The conveyor belt system as claimed in claim 10, wherein
the running drive of the conveyor belt is connected to the electronic controller and in that the speed of the running drive of the conveyor belt is regulable by means of the electronic controller according to the stipulation of the signals of the at least one sensor.

16. The conveyor belt system as claimed in claim 10, wherein
a plurality of stripping segments are provided and in that a dedicated setting drive assigned to each individual stripping segment such that each stripping segment, by means of its setting drive, can be set individually against the conveyor belt.

17. The conveyor belt system as claimed in claim 10, wherein
the electronic controller has at least one data memory, in which setpoint values for measurement values of the at least one sensor are storable, wherein, certain typical process states of the at least one stripping segment are initially capturable and storable in the at least one data memory of the electronic controller, and
wherein, for the purposes of regulating the operation of the conveyor belt system by means of the electronic controller, a comparison of the established actual state with at least one stored typical process state of the conveyor belt system is performable.

18. The conveyor belt system as claimed in claim 10, wherein
the at least one stripping segment is arranged on a bearing shaft of the stripping apparatus and the bearing shaft is driven by the setting drive and
in that vibrations of the bearing shaft of the stripping apparatus are capturable by the sensor.

19. The conveyor belt system as claimed in claim 10, wherein
for the purposes of capturing a further reference variable for the electronic controller, the system comprises a further sensor, embodied as an image processing electronic system and able to optically capture a certain spatial monitoring region and
in that the further sensor is arranged at the conveyor belt system in such a way that a portion of the at least one stripping segment lies in the monitoring region.

20. The conveyor belt system as claimed in claim 19, wherein the at least one stripping segment is provided with at least one optically identifiable wear mark, which is capturable by the optical sensor.

21. A conveyor belt system, comprising a conveyor belt, arranged in an endlessly revolving manner with a conveying portion lying on top, and a return portion lying therebelow, a running drive that is connected in terms of drive technology to the conveyor belt and that allows the conveyor belt to be drivable in an endlessly revolving manner in the conveying direction in the conveying portion and in the return direction, opposite to the conveying direction, in the return portion, a stripping apparatus for stripping transported material adhering to the conveyor belt, said stripping apparatus having at least one stripping segment, which, with a stripping edge, can be set against the conveyor belt, wherein transported material adhering to the conveyor belt is strippable from the conveyor belt by means of the stripping apparatus in a transition region, situated at the front in the conveying direction, from the conveying portion to the return portion and/or in the initial region of the return portion situated there, a setting drive for the at least one stripping segment, by means of which the stripping edge of the stripping segment can be set against the conveyor belt, and an electronic controller, wherein at least the setting force, with which the at least one stripping segment can be set against the conveyor belt by means of the setting drive, is regulable as a controlled variable by the electronic controller according to the stipulation of a value of at least one reference variable established by at least one sensor, wherein the sensor is embodied as an image processing electronic system and can be used to optically capture a certain spatial monitoring region and in that the optical sensor is arranged at the conveyor belt system in such a way that a portion of the at least one stripping segment lies in the monitoring region.

22. A process for regulating the operation of a stripping apparatus at a conveyor belt of a conveyor belt system for transported material, wherein the conveyor belt is driven in an endlessly revolving manner by a running drive and said conveyor belt runs in the conveying direction in a conveying portion lying on top, and runs in the return direction, opposite to the conveying direction, in a return portion lying therebelow, wherein, for the purposes of stripping transported material adhering to the conveyor belt in a transition region, situated at the front in the conveying direction, from the conveying portion to the return portion and/or in the initial region of the return portion situated there, at least one stripping segment of the stripping apparatus is set with its stripping edge against the conveyor belt by a setting drive, wherein at least the setting force, with which the setting drive sets the at least one stripping segment against the conveyor belt, is regulated as a controlled variable by an electronic controller according to the stipulation of a value of at least one reference variable established by at least one sensor, wherein the output signal of an optical sensor embodied as an image processing electronic system is used as a reference variable, said optical sensor optically capturing a state of the at least one stripping segment.

23. The process as claimed in claim 22, wherein the at least one stripping segment is provided with at least one optically identifiable wear mark, which is captured by the assigned optical sensor.

24. The process as claimed in claim 22, wherein an output signal of at least one acoustic sensor embodied as a microphone is used as a reference variable, said acoustic sensor capturing the noise caused by the running conveyor belt system.

* * * * *